US012669917B2

(12) United States Patent
 Che

(10) Patent No.: US 12,669,917 B2
(45) Date of Patent: Jun. 30, 2026

(54) CONTROL DISPLAY METHOD, APPARATUS, AND DEVICE, AND MEDIUM

(71) Applicant: Beijing Zitiao Network Technology Co., Ltd., Beijing (CN)

(72) Inventor: Wanli Che, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/390,406

(22) Filed: Dec. 20, 2023

(65) Prior Publication Data

US 2024/0118794 A1      Apr. 11, 2024

Related U.S. Application Data

(63) Continuation of application No. PCT/CN2022/098364, filed on Jun. 13, 2022.

(30) Foreign Application Priority Data

Jun. 29, 2021   (CN) .......................... 202110727369.2

(51) Int. Cl.
  *G06F 3/048*        (2013.01)
  *G06F 3/0481*       (2022.01)
  *G06F 3/0484*       (2022.01)
(52) U.S. Cl.
  CPC .......... *G06F 3/0484* (2013.01); *G06F 3/0481* (2013.01)
(58) Field of Classification Search
  None
  See application file for complete search history.

(56) References Cited

U.S. PATENT DOCUMENTS

| | | | |
|---|---|---|---|
| 6,857,105 B1 * | 2/2005 | Fox ....................... | G06F 3/0482 |
| | | | 715/825 |
| 8,104,048 B2 * | 1/2012 | Jalon ..................... | G06F 16/168 |
| | | | 715/239 |
| 9,535,594 B1 * | 1/2017 | Alonso Ruiz .... | H04N 21/42224 |
| 9,769,529 B2 * | 9/2017 | Park ..................... | H04N 21/435 |

(Continued)

FOREIGN PATENT DOCUMENTS

| | | |
|---|---|---|
| CN | 104902098 A | 9/2015 |
| CN | 107132971 A | 9/2017 |

(Continued)

OTHER PUBLICATIONS

European Patent Office, Extended European Search Report Issued in Application No. 22831674.1, Sep. 10, 2024, Germany, 9 pages.

(Continued)

*Primary Examiner* — Hua Lu
(74) *Attorney, Agent, or Firm* — Alleman Hall LLP

(57)      ABSTRACT

The present disclosure discloses a control display method, apparatus, and device, and a medium. The control display method includes: displaying a first group of function controls and a first trigger control in a target interface sidebar and switching the first group of function controls to a second group of function controls in the target interface sidebar for display upon detecting a first trigger operation on the first trigger control. The second group of function controls is adjacent to the first group of function controls in a first switching direction corresponding to the first trigger control.

16 Claims, 9 Drawing Sheets

(56) References Cited

U.S. PATENT DOCUMENTS

| | | | |
|---|---|---|---|
| 2005/0210410 A1* | 9/2005 | Ohwa | G06F 3/0482 |
| | | | 715/767 |
| 2006/0168538 A1* | 7/2006 | Stevens | G06F 3/04817 |
| | | | 715/779 |
| 2007/0192725 A1 | 8/2007 | Chen et al. | |
| 2008/0034381 A1* | 2/2008 | Jalon | G06F 16/168 |
| | | | 719/329 |
| 2009/0315867 A1* | 12/2009 | Sakamoto | G06F 3/0488 |
| | | | 345/184 |
| 2010/0058244 A1* | 3/2010 | Wang | G06F 3/0482 |
| | | | 715/838 |
| 2010/0131880 A1* | 5/2010 | Lee | H04M 1/7243 |
| | | | 345/173 |
| 2010/0185970 A1* | 7/2010 | Benenson | G06F 3/0482 |
| | | | 715/810 |
| 2010/0267449 A1* | 10/2010 | Gagner | G06F 3/0488 |
| | | | 463/30 |
| 2011/0252383 A1* | 10/2011 | Miyashita | G06F 3/04886 |
| | | | 715/863 |
| 2011/0252446 A1* | 10/2011 | Jeong | H04N 21/482 |
| | | | 725/38 |
| 2011/0258582 A1* | 10/2011 | Bang | G06F 3/04817 |
| | | | 715/830 |
| 2012/0066627 A1* | 3/2012 | Furukawa | G06F 3/0488 |
| | | | 715/768 |
| 2012/0066644 A1* | 3/2012 | Mizutani | G06F 3/04855 |
| | | | 715/810 |
| 2012/0086650 A1* | 4/2012 | Oiwa | G06F 3/04883 |
| | | | 345/173 |
| 2012/0120316 A1* | 5/2012 | Lee | H04N 21/4751 |
| | | | 348/E5.103 |
| 2012/0185800 A1* | 7/2012 | Hart | G06F 3/0485 |
| | | | 715/810 |
| 2013/0002565 A1* | 1/2013 | Tumanov | G06F 1/3231 |
| | | | 345/173 |
| 2013/0082928 A1* | 4/2013 | Kim | G06F 3/0425 |
| | | | 345/168 |
| 2013/0219299 A1 | 8/2013 | Yerli | |
| 2014/0013255 A1* | 1/2014 | Fukuoka | G06F 3/0484 |
| | | | 715/765 |
| 2014/0053097 A1* | 2/2014 | Shin | G06F 9/451 |
| | | | 715/779 |
| 2014/0082560 A1* | 3/2014 | Okada | H04N 1/00411 |
| | | | 715/835 |
| 2014/0189551 A1* | 7/2014 | Kim | G06F 3/0488 |
| | | | 715/765 |
| 2014/0282151 A1 | 9/2014 | Harvey | |
| 2014/0310643 A1* | 10/2014 | Karmanenko | G06F 1/1626 |
| | | | 455/566 |
| 2016/0139750 A1* | 5/2016 | Barrus | G06F 3/0481 |
| | | | 715/777 |
| 2016/0173318 A1* | 6/2016 | Ha | H04W 4/02 |
| | | | 709/223 |
| 2018/0052586 A1 | 2/2018 | Guan | |
| 2018/0139155 A1* | 5/2018 | Kurisu | H04L 67/535 |
| 2019/0018658 A1* | 1/2019 | Martello | G06F 40/177 |
| 2021/0349613 A1* | 11/2021 | Sugiyama | G06F 3/04817 |

FOREIGN PATENT DOCUMENTS

| | | |
|---|---|---|
| CN | 107688428 A | 2/2018 |
| CN | 108549510 A | 9/2018 |
| CN | 108762870 A | 11/2018 |
| CN | 108958805 A | 12/2018 |
| CN | 108958867 A | 12/2018 |
| CN | 109144649 A | 1/2019 |
| CN | 110244949 A | 9/2019 |
| CN | 107943375 B | 6/2021 |
| CN | 113342230 A | 9/2021 |
| JP | 2002259009 A | 9/2002 |
| JP | 2006024144 A | 1/2006 |
| JP | 2008084250 A | 4/2008 |
| JP | 2009266201 A | 11/2009 |
| JP | 2011018085 A | 1/2011 |
| JP | 2011043809 A | 3/2011 |
| JP | 2011197248 A | 10/2011 |
| WO | 2005022337 A2 | 3/2005 |
| WO | 2017118329 A1 | 7/2017 |

OTHER PUBLICATIONS

Japan Patent Office, Notice of Reasons for Refusal Issued in Application No. 2023578989, Dec. 17, 2024, 6 Pages.

* cited by examiner

CONTROL DISPLAY METHOD, APPARATUS, AND DEVICE, AND MEDIUM

CROSS-REFERENCE TO RELATED APPLICATION

The present application is a continuation of International Patent Application No. PCT/CN2022/098364, filed on Jun. 13, 2022, which claims priority of the Chinese Patent Application No. 202110727369.2, filed on Jun. 29, 2021, and the entire content disclosed by the Chinese patent application is incorporated herein by reference as part of the present application.

TECHNICAL FIELD

The present disclosure belongs to the technical field of interface display, and particularly relates to a control display method, apparatus, and device, and a medium.

BACKGROUND

In order to facilitate the user's operation, function controls with interactive functions are usually displayed in a sidebar of an interactive interface of an application.

However, as the variety of selectable function controls increases, the existing sidebar of the interactive interface is no longer able to provide users with all the function controls they need, reducing the interactive functions that the user can use within the interactive interface and lowering the user experience.

SUMMARY

In order to solve or at least partially solve the above technical problems, the present disclosure provides a control display method, apparatus, and device, and a medium.

In a first aspect, the present disclosure provides a control display method, comprising: displaying a first group of function controls and a first trigger control in a target interface sidebar; and switching the first group of function controls to a second group of function controls in the target interface sidebar for display upon detecting a first trigger operation on the first trigger control. The second group of function controls is adjacent to the first group of function controls in a first switching direction corresponding to the first trigger control.

In a second aspect, the present disclosure provides a control display apparatus, comprising: a first display unit, configured to display a first group of function controls and a first trigger control in a target interface sidebar; and a second display unit, configured to switch the first group of function controls to a second group of function controls in the target interface sidebar for display upon detecting a first trigger operation on the first trigger control. The second group of function controls is adjacent to the first group of function controls in a first switching direction corresponding to the first trigger control.

In a third aspect, the present disclosure provides a control display device, comprising: a processor; and a memory, for storing executable instructions. The processor is used to read the executable instructions from the memory and execute the executable instructions to implement the control display method described in the first aspect.

In a fourth aspect, the present disclosure provides a computer-readable storage medium, the computer-readable storage medium stores a computer program, when the computer program is executed by a processor, causing the processor to implement the control display method described in the first aspect.

Compared with the prior art, the technical solution provided by the embodiments of the present disclosure has the following advantages.

According to the control display method, apparatus, and device, and a medium provided by the embodiments of the present disclosure, function controls can be displayed in groups within a target interface sidebar, thus increasing the number of function controls that can be provided to the user in the sidebar of the interactive interface, and improving the function expansion capability of the sidebar of the interactive interface. By triggering a first trigger control, a first group of function controls can be switched to a second group of function controls, which is adjacent to the first group of function controls in a first switching direction corresponding to the first trigger control, in the target interface sidebar for display, so as to provide the user with more interactive functions that can be used under the circumstance of facilitating the operation of the user, thereby enhancing the user experience.

BRIEF DESCRIPTION OF THE DRAWINGS

The accompanying drawings are provided to facilitate further understanding of the present disclosure and constitute a part of the specification, and together with the embodiments of the present disclosure, serve to explain the present disclosure and do not constitute a limitation of the present disclosure. In the drawings.

DETAILED DESCRIPTION

Figure 1:
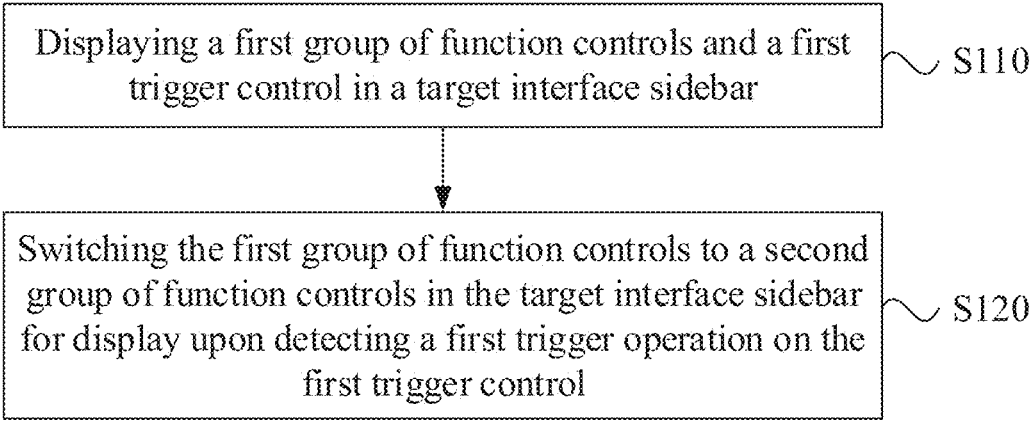
FIG. 1 is a flowchart of a control display method provided by an embodiment of the present disclosure.

Embodiments of the present disclosure will be described in greater detail below with reference to the accompanying drawings. While some embodiments of the present disclosure are shown in the accompanying drawings, it should be understood, however, that the present disclosure may be implemented in various forms and should not be construed as being limited to the embodiments set forth herein; on the contrary, these embodiments are provided for a more thorough and complete understanding of the present disclosure. It should be understood that the accompanying drawings and embodiments of the present disclosure are for exemplary purposes only and are not intended to limit the scope of protection of the present disclosure.

It should be understood that various steps recorded in the implementations of the method provided by the present disclosure can be performed in different order, and/or performed in parallel. Further, the implementations of the method can include additional steps and/or omit performing the steps illustrated. The scope of the present disclosure is not limited in this respect.

The term "comprise/include" and variations thereof as used herein mean open-ended comprising/including, i.e. "comprising/including but not limited to". The term "based on" is "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first", "second", etc. mentioned in the present disclosure are only used for distinguishing different devices, modules, or units, and are not intended to limit the order or interdependence of the functions performed by these devices, modules, or units.

It should be noted that the modifications of "one" and "plurality" mentioned in the present disclosure are schematic rather than restrictive, and those skilled in the art should understand that unless otherwise expressly indicated in the context, it should be understood as "one or more".

The names of messages or information interacted between a plurality of apparatuses in the embodiments of the present disclosure are used for illustrative purposes only and are not used to limit the scope of such messages or information.

In many existing applications, in order to facilitate the operation of the user, function controls with interactive functions are usually displayed in a sidebar of an interactive interface. However, as the variety of selectable function controls increases, the existing sidebar of the interactive interface is no longer able to provide users with all the function controls they need, reducing the interactive functions that the user can use within the interactive interface and lowering the user experience.

In order to solve the above problems, the embodiments of the present disclosure provide a control display method, apparatus, and device, and a medium, aiming at increasing the number of function controls that can be provided to the user by the sidebar of the interactive interface under the circumstance of facilitating the operation of the user in application scenarios where various interactive operations can be performed, such as capturing or editing multimedia content (such as at least one of images, audio, and videos), browsing web pages, playing games, and manipulating electronic device desktops, thus improving the function expansion capability of the sidebar of the interactive interface.

The control display method provided by an embodiment of the present disclosure will be described first with reference to FIGS. 1-8.

In the embodiment of the present disclosure, the control display method may be executed by an electronic device. The electronic device may include, but is not limited to, mobile terminals such as a mobile phone, a notebook computer, a digital broadcasting receiver, a personal digital assistant (PDA), a tablet computer (PAD), a portable multimedia player (PMP), a vehicle-mounted terminal (such as a vehicle-mounted navigation terminal), a wearable device, or the like, and fixed terminals such as a digital TV, a desktop computer, a smart home device, or the like.

FIG. 1 is a flowchart of a control display method provided by an embodiment of the present disclosure. As shown in FIG. 1, the control display method may comprise the following steps.

S110, displaying a first group of function controls and a first trigger control in a target interface sidebar.

In the embodiment of the present disclosure, the target interface sidebar refers to a region that is used to display function controls that implement the interactive function in an application interface with an interactive function.

The target interface sidebar may be a left sidebar, a right sidebar, an upper sidebar or a lower sidebar respectively displayed on a left side, a right side, an upper side or a lower side of the page in the application interface. The display size of the target interface sidebar in the application interface may be fixed or dynamically adjusted according to the number of displayed function controls and the sizes of the displayed function controls.

In an implementation in which the display size of the target interface sidebar is dynamically adjusted, a length of a short side of the target interface sidebar remains unchanged, and a length of a long side of the target interface sidebar is adjusted according to the number of displayed function controls and the sizes of the displayed function controls. Here, the short side may refer to a side of the target interface sidebar that is perpendicular to a side of the application interface along which the target interface sidebar is arranged, while the long side may refer to a side of the target interface sidebar that is parallel to the side of the application interface along which the target interface sidebar is arranged.

For example, when the target interface sidebar is the left sidebar or the right sidebar, the short side of the target interface sidebar is a side, perpendicular to a left side or a right side of the application interface, of the target interface sidebar, and the length of the target interface sidebar remains unchanged. When the target interface sidebar is the upper sidebar or the lower sidebar, the short side of the target interface sidebar is a side, perpendicular to an upper side or a lower side of the application interface, of the target interface sidebar, and the length of the target interface sidebar remains unchanged.

In the embodiment of the present disclosure, the first group of function controls may be any group of function controls in the function controls to be displayed when the function controls to be displayed are displayed in groups.

In some embodiments, the function controls to be displayed may be grouped based on the frequency of using various function controls to be displayed by a plurality of users. For example, if there are 10 function controls to be displayed in total, the 10 function controls to be displayed are sorted according to the comprehensive frequency of using each preset functional control by a plurality of users, the top five function controls to be displayed are determined as a group of function controls, and the remaining five function controls to be displayed are determined as another group of function controls. In this embodiment, the function controls to be displayed in each group of function controls remain unchanged.

In other embodiments, the function controls to be displayed may be grouped based on the frequency of using various function controls to be displayed by a current user. In this embodiment, the function controls to be displayed in the first group of function controls corresponding to one user may be different from the function controls to be displayed in the first group of function controls corresponding to another user. Moreover, the function controls to be displayed in the first group of function controls corresponding to the same user may also change with the use duration of the interactive functions. For example, if the current user frequently uses a "Beautify" function for capturing during a certain period of time, but rarely uses a "Edit" function for post-capturing processing, then the first group of function controls comprises, during the certain period of time, the "Beautify" function control and does not comprise the "Edit" function control. However, if the current user frequently uses the "Edit" function for post-capturing processing but rarely uses the "Beautify" function for capturing during another period of time, then the first group of function controls comprises, during that another period of time, the "Edit" function control and does not comprises the "Beautify" function control.

The first trigger control refers to a control that allows the user to perform a trigger operation and is used to trigger the display of other function controls to be displayed than the first group of function controls. For example, the first trigger control may be a trigger control indicating functions such as "More" or "Expand". For another example, the first trigger control may also be a trigger control indicating functions such as "Collapse". The trigger operation here may be a click operation, a voice control operation, a gesture control operation, or an eye movement control operation, etc.

Specifically, after the user enters the application interface of the application, an electronic device can display the target interface sidebar in the application interface, and display the first group of function controls and the first trigger control in the target interface sidebar.

Taking an application scenario of capturing or editing multimedia content as an example for explanation, in this case, the application interface may be a capturing interface or editing interface for multimedia content. The multimedia content may include at least one selected from a group comprising images, audio, and videos.

In some embodiments, the target interface sidebar may be a left sidebar or a right sidebar of the application interface such as the capturing interface or the editing interface.

Figure 2:
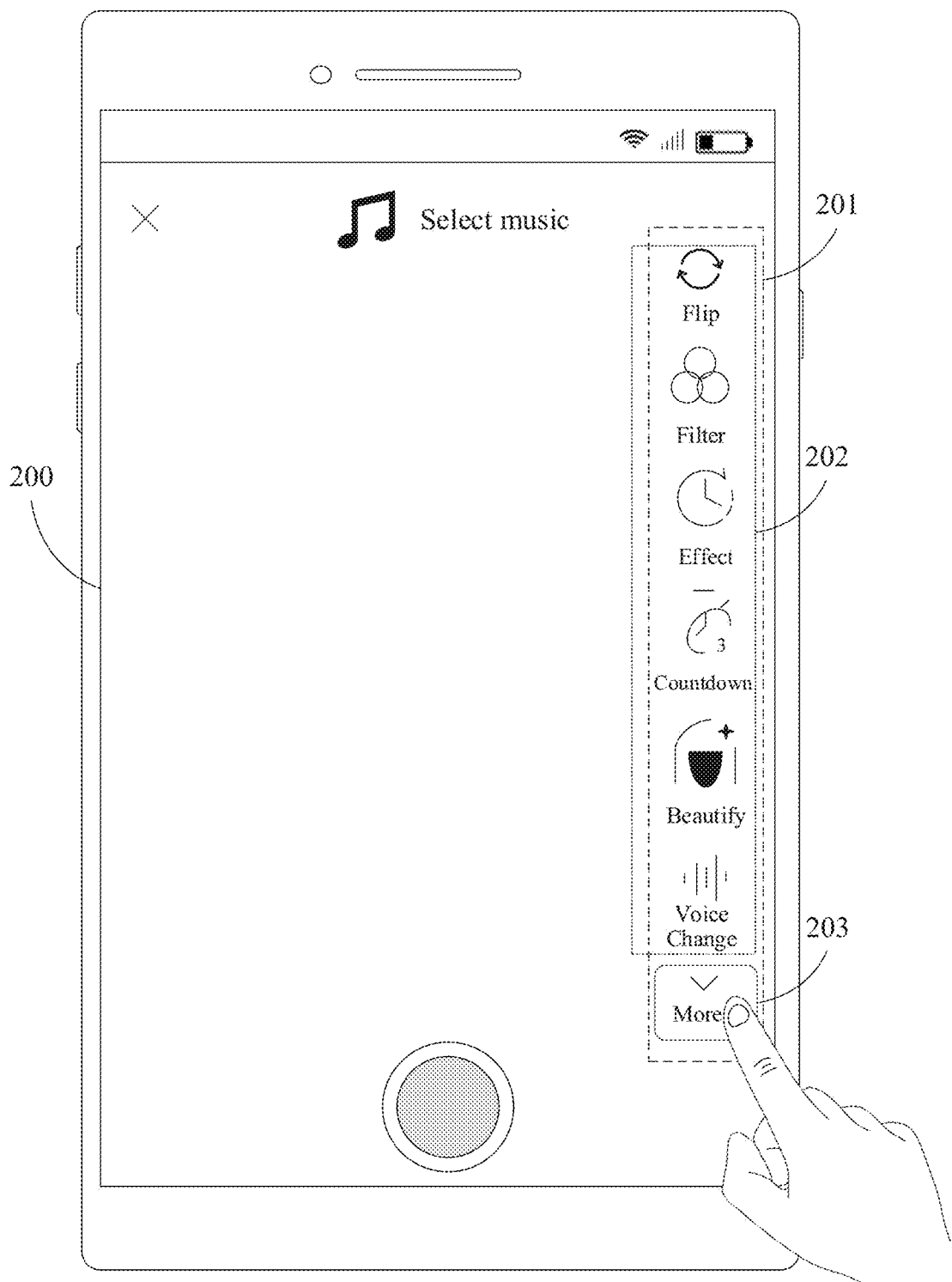
FIG. 2 is a schematic diagram displaying a function control in an application interface according to an embodiment of the present disclosure.

FIG. 2 shows a schematic diagram displaying a function control in an application interface according to an embodiment of the present disclosure.

As shown in FIG. 2, the electronic device may display an application interface 200, a target interface sidebar 201 is displayed in a right sidebar of the application interface 200, a first group of function controls 202 and a first trigger control 203 are displayed in the target interface sidebar 201, and the first group of function controls 202 comprises six function controls to be displayed, namely, "Flip", "Filter", "Effect", "Countdown", "Beautify", and "Voice Change".

It should be noted that the first group of function controls in the target interface sidebar displayed in the left sidebar or right sidebar may be displayed in several columns in addition to in a single column as shown in FIG. 2. When the first group of function controls is displayed in several columns, the number of function controls to be displayed in each column is the same.

In other embodiments, the target interface sidebar may be an upper sidebar or a lower sidebar of the application interface such as the capturing interface or the editing interface.

Figure 3:
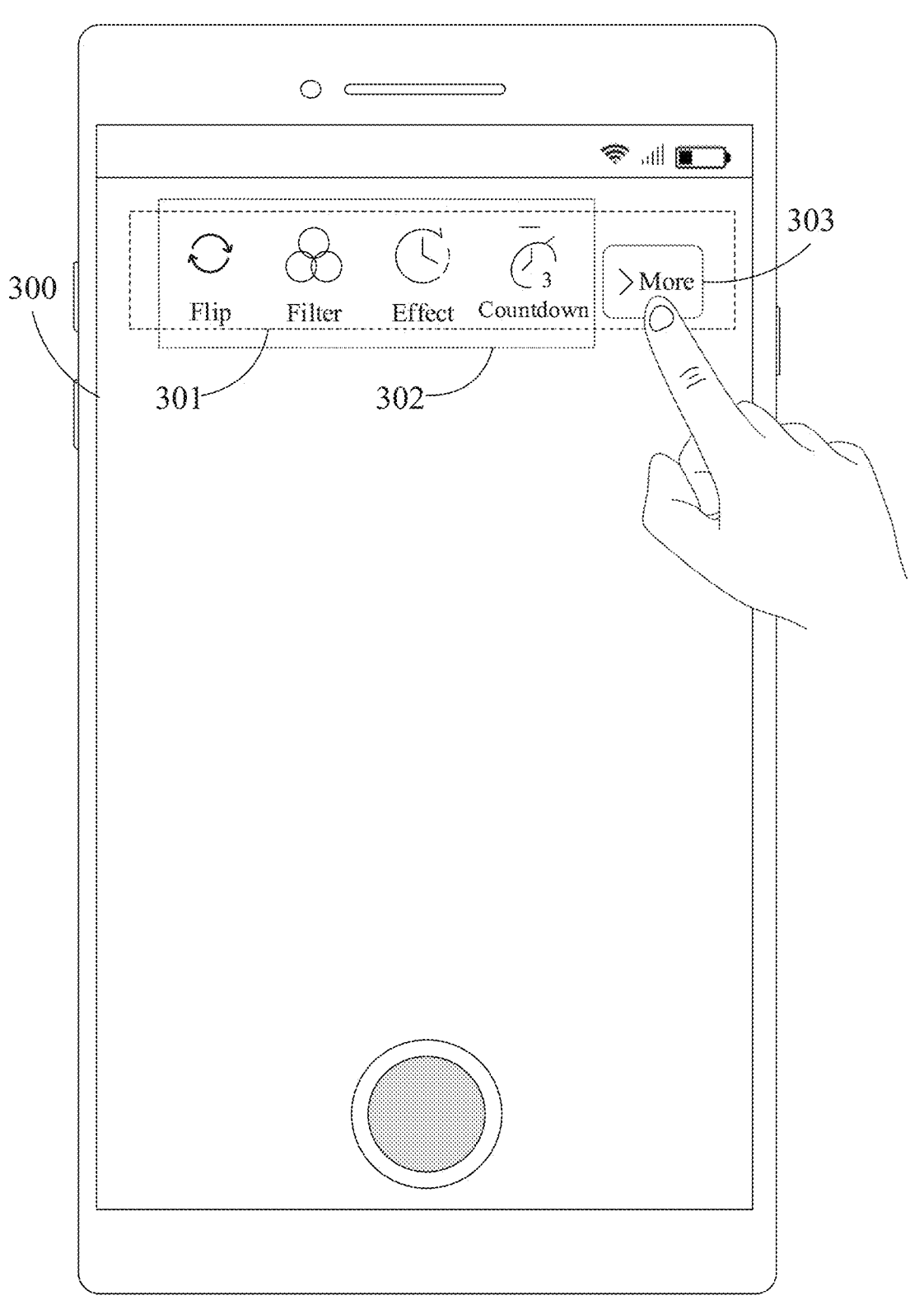
FIG. 3 is another schematic diagram displaying a function control in an application interface according to an embodiment of the present disclosure.

FIG. 3 shows another schematic diagram displaying a function control in an application interface according to an embodiment of the present disclosure.

As shown in FIG. 3, the electronic device may display an application interface 300, a target interface sidebar 301 is displayed in the upper sidebar of the application interface 300, a first group of function controls 302 and a first trigger control 303 are displayed in the target interface sidebar 301, and the first group of function controls 302 comprises four function controls to be displayed, namely, "Flip", "Filter", "Effect", and "Countdown".

It should be noted that the first group of function controls in the target interface sidebar displayed in the upper sidebar or lower sidebar may be displayed in several rows in addition to in a single row as shown in FIG. 3. When the first group of function controls is displayed in several rows, the number of function controls to be displayed in each row is the same.

S120, switching the first group of function controls to a second group of function controls in the target interface sidebar for display upon detecting a first trigger operation on the first trigger control.

In the embodiment of the present disclosure, the second group of function controls is another group of function controls to be displayed which is different from the first group of function controls.

Optionally, the second group of function controls is adjacent to the first group of function controls in a first switching direction corresponding to the first trigger control. That is, the second group of function controls is a group of function controls adjacent to the first group of function controls in the first switching direction among the function controls to be displayed. The first switching direction refers to a switching direction of respective function controls to be displayed when the first trigger control is triggered. That is, if there are more than two groups of function controls, then the second group of function controls is a group of function controls adjacent to the first group of function controls, rather than any group of function controls. Moreover, the second group of function controls must be a group of function controls adjacent to the first group of function controls in the first switching direction.

Optionally, the first switching direction indicates switching to a group of function controls located thereafter and adjacent thereto, and the second group of function controls is a group of function controls located after the first group of function controls and adjacent to the first group of function controls. Alternatively, the first switching direction indicates switching to a group of function controls located therebefore and adjacent thereto, and the second group of function controls is a group of function controls located before the first group of function controls and adjacent to the first group of function controls.

In some embodiments, the first switching direction may be a direction in which switching to a group of function controls located thereafter and adjacent thereto is performed, and the second group of function controls is a group of function controls located after the first group of function controls and adjacent to the first group of function controls. In other embodiments, the first switching direction may also be a direction in which switching to a group of function controls located therebefore and adjacent thereto is performed, and the second group of function controls is a group of function controls located before the first group of function controls and adjacent to the first group of function controls.

The first trigger operation is a trigger operation on the first trigger control, and may be a click operation, a voice control operation, a gesture control operation, or an eye movement control operation.

Specifically, if the user triggers the first trigger control in the target interface sidebar, the electronic device can detect the trigger operation (i.e., the first trigger operation) on the first trigger control. In this case, the electronic device switches the first group of function controls in the target interface sidebar to the second group of function controls and displays the second group of function controls. The process of switching display may be a static replacement process, and the user can see the results before and after switching, or the process of switching display may also be a dynamic switching process visible to the user.

Figure 4:
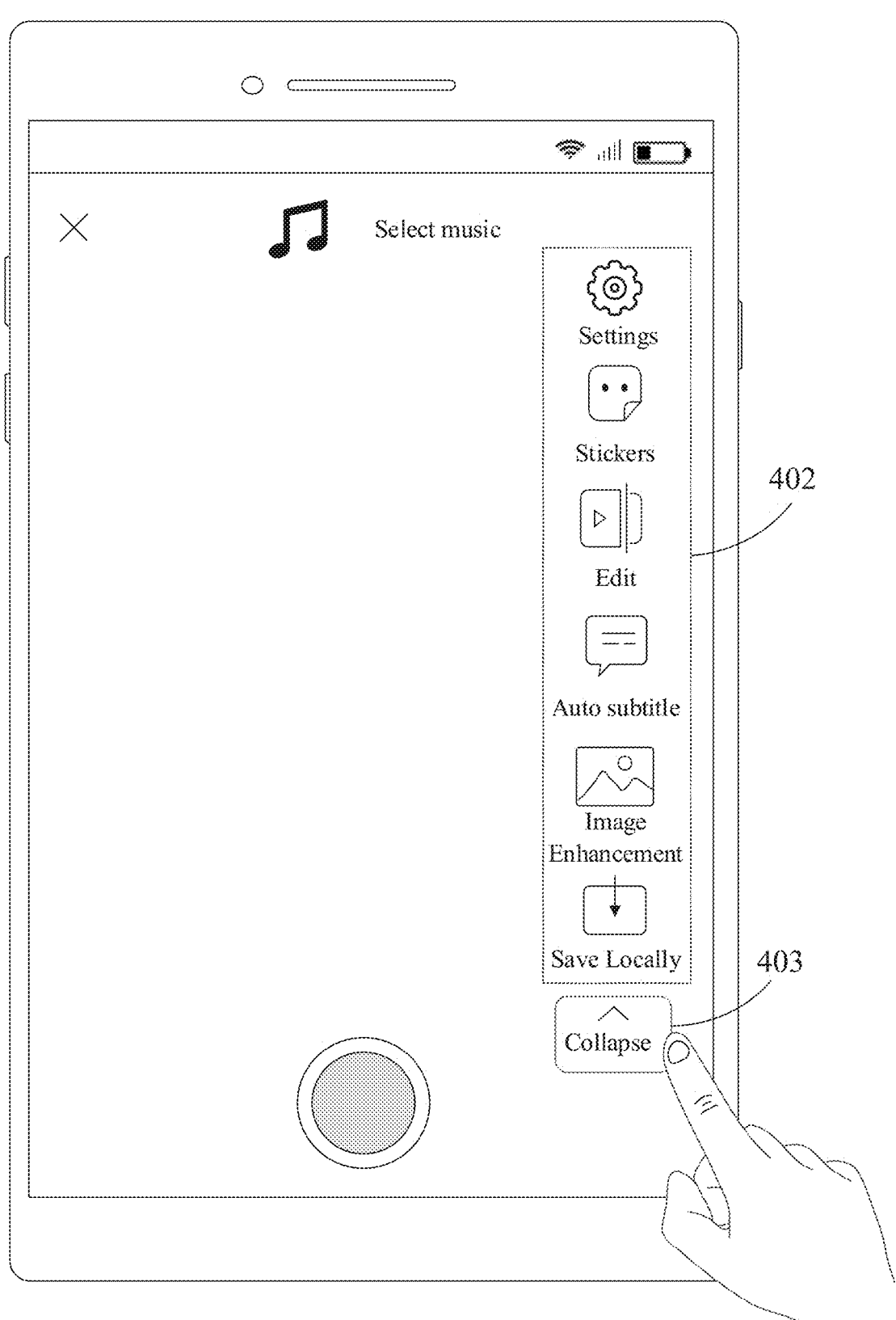
FIG. 4 is another schematic diagram displaying a function control in an application interface according to an embodiment of the present disclosure.

Continuing referring to FIG. 2, if the first switching direction is a direction in which switching to a group of function controls located thereafter and adjacent thereto is performed, and a moving direction of the function controls to be displayed is upward. Then after the user triggers the first trigger control 203, the first group of function controls 202 will be replaced by a second group of function controls located below the first group of function controls 202, and the display effect is shown in FIG. 4. The first group of function controls 402 shown in FIG. 4 comprises six function controls to be displayed, namely, "Settings", "Stickers", "Edit", "Auto subtitle", "Image Enhancement", and "Save Locally".

Figure 5:
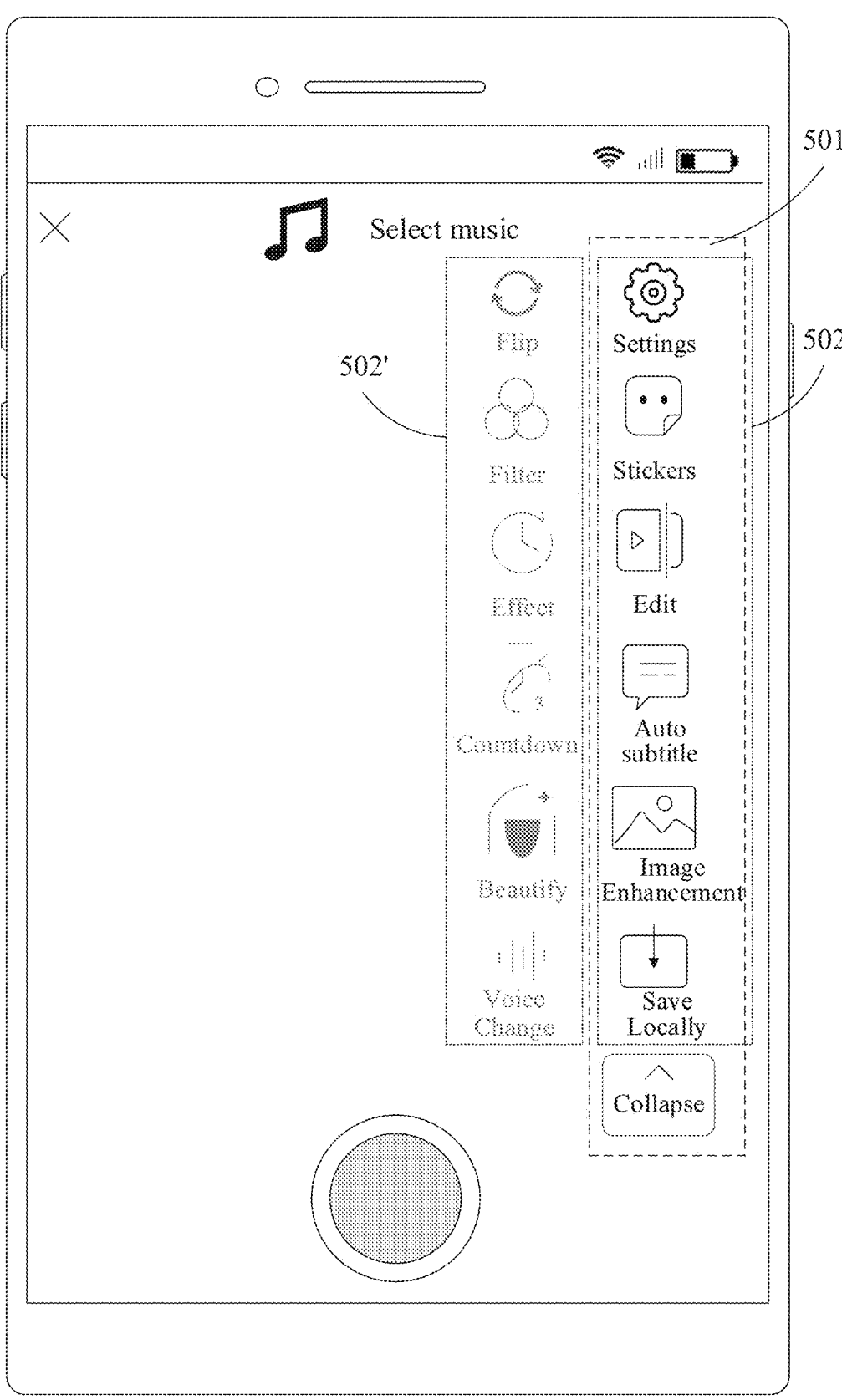
FIG. 5 is still another schematic diagram displaying a function control in an application interface according to an embodiment of the present disclosure.

Still referring to FIG. 2, if the first switching direction is a direction in which switching to a group of function controls located thereafter and adjacent thereto is performed, and a moving direction of the function controls to be displayed is to the left. Then after the user triggers the first trigger control 203, the first group of function controls 202 will be replaced by a second group of function controls located to the right of the first group of function controls 202, and the display effect is shown in FIG. 5. In FIG. 5, a first group of function controls 502' in FIG. 2 is hidden, while a first group of function controls 502 in FIG. 5 is displayed. The first group of function controls 502 comprises six function controls to be displayed, namely, "Settings", "Stickers", "Edit", "Auto subtitle", "Image Enhancement", and "Save Locally".

Figure 6:
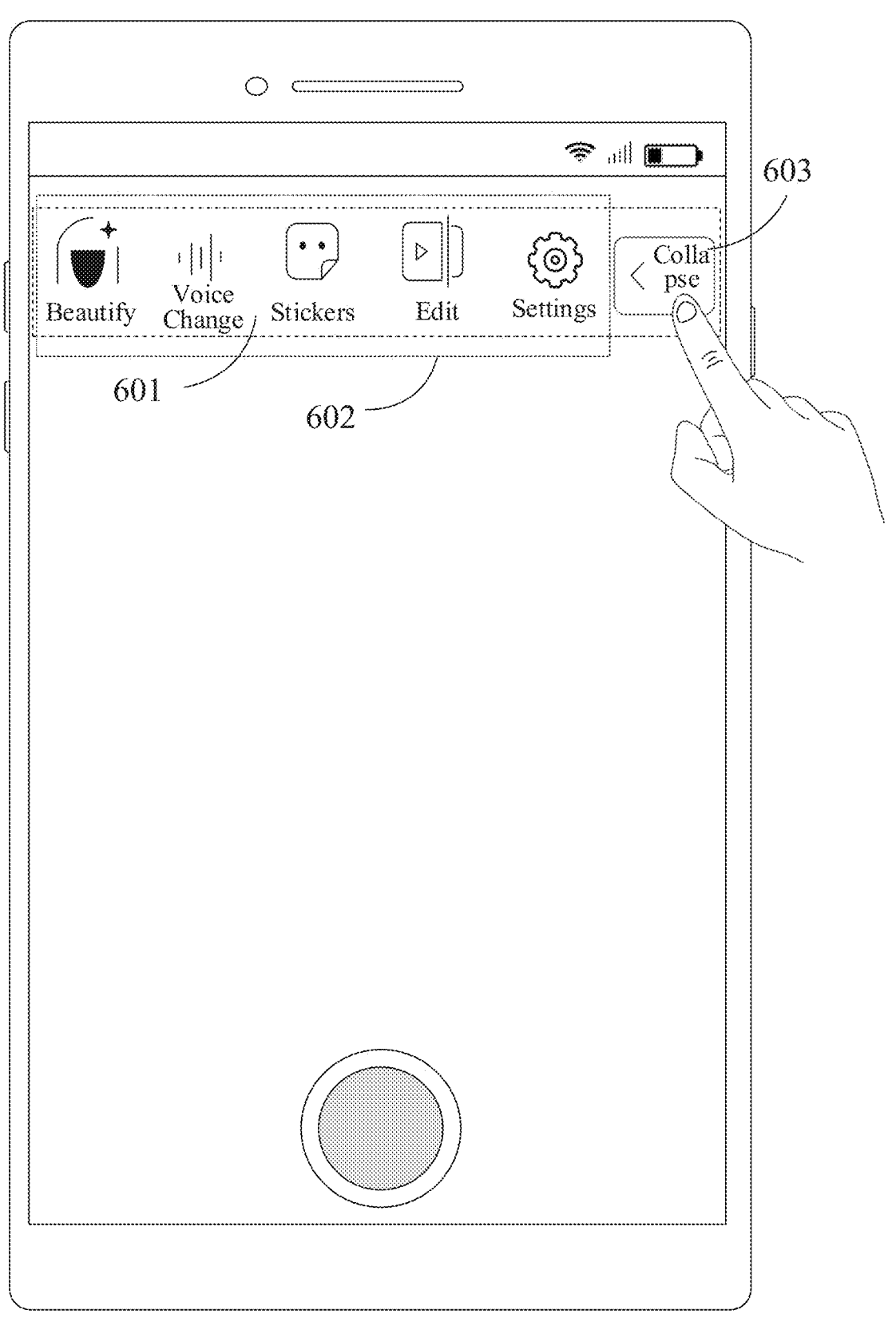
FIG. 6 is still another schematic diagram displaying a function control in an application interface according to an embodiment of the present disclosure.

Continuing referring to FIG. 3, if the first switching direction is a direction in which switching to a group of function controls located thereafter and adjacent thereto is performed, and a moving direction of the function controls to be displayed is to the left. Then after the user triggers the first trigger control 303, the first group of function controls 302 will be replaced by a second group of function controls located to the right of the first group of function controls 302, and the display effect is shown in FIG. 6. The first group of function controls 602 shown in FIG. 6 comprises five function controls to be displayed, namely, "Beautify", "Voice Change", "Stickers", "Edit", and "Settings".

It can be seen from FIGS. 2 and 3 that in order to reduce the obstruction of multimedia content, although the display region of the sidebar in the application interface such as the capturing interface or editing interface is limited, the embodiment of the present disclosure can still expand more control functions for the application interface within the limited display region of the sidebar to provide users with more interactive functions.

In summary, according to the control display method provided by the embodiment of the present disclosure, function controls can be displayed in groups within a target interface sidebar, thus increasing the number of function controls that can be provided for users in the sidebar of the interactive interface, and enhancing the function expansion capability of the sidebar of the interactive interface. By triggering a first trigger control, a first group of function controls can be switched to a second group of function controls, which is adjacent to the first group of function controls in a first switching direction corresponding to the first trigger control, in the target interface sidebar for display, so as to provide the user with more interactive functions that can be used under the circumstance of facilitating the operation of the user, thereby enhancing the user experience.

In one implementation of the present disclosure, the content displayed in the target interface sidebar is related to the number of function controls to be displayed.

In some embodiments, S110 comprises: displaying the first group of function controls and the first trigger control in the target interface sidebar in a case where a total number of function controls to be displayed is greater than a preset quantity threshold.

The preset quantity threshold is a predetermined quantity value, which is used to determine whether to group and display the function controls to be displayed. The preset quantity threshold may be set empirically, or calculated according to the size of the target interface sidebar and the control sizes of the function controls to be displayed.

Specifically, the total number of the function controls to be displayed is compared with the preset quantity threshold. If the total number is greater than the preset quantity threshold, it is determined that all the function controls to be displayed cannot be displayed at one time in the target interface sidebar, then the function controls to be displayed are grouped, and the first group of function controls and the first trigger control are displayed in the target interface sidebar.

In other embodiments, when the total number of the function controls to be displayed is less than or equal to the preset quantity threshold, the function controls to be displayed are displayed in the target interface sidebar. That is, if the total number of the function controls to be displayed is less than or equal to the preset quantity threshold, it is determined that all the function controls to be displayed can be accommodated in the target interface sidebar. In this case, there is no need to group the function controls to be displayed; instead, all the function controls to be displayed are directly displayed in the target interface sidebar. Because there are no other function controls to be displayed that need to be displayed, it is no need to display the first trigger control in the target interface sidebar.

Through the above settings, it is possible to display more suitable controls within the target interface sidebar, thereby avoiding interference with the interaction operation of the user due to displaying redundant controls, thus further enhancing both the efficiency and experience of the inter-action operation of the user.

In yet another implementation of the present disclosure, the content displayed in the target interface sidebar is related to the number of groups of the function controls to be displayed. However, it should be noted that when determining the content displayed in the target interface sidebar, the priority of determining the total number of the function controls to be displayed, as described above, is higher than the priority of determining the number of groups of the function controls to be displayed in this implementation.

In some embodiments, after S110, in a case where the second group of function controls is not a last group of function controls in the first switching direction, the first trigger control remains displayed in the target interface sidebar.

In the embodiment of the present disclosure, the first trigger control is used to trigger to switch from the second group of function controls to a third group of function controls in the target interface sidebar for display. The third group of function controls is adjacent to the second group of function controls in the first switching direction. That is, the third group of function controls is a group of function controls adjacent to the second group of function controls in the first switching direction among the function controls to be displayed.

In this embodiment, after switching to display the second group of function controls, whether the second group of function controls is the last group of function controls in the first switching direction is determined. If the second group of function controls is not the last group of function controls in the first switching direction, it means that more function controls to be displayed can continue to be triggered, in the first switching direction, to be displayed, so the first trigger control can remain displayed in the target interface sidebar.

Optionally, after the second group of function controls is displayed, and in the case that the second group of function controls is not the last group of function controls in the first switching direction, a second trigger control can also be displayed in the target interface sidebar.

In the embodiment of the present disclosure, the second trigger control can be used to trigger to switch from the second group of function controls to the first group of function controls in the target interface sidebar to display the first group of function controls. Optionally, a switching direction (i.e., a second switching direction) corresponding to the second trigger control is opposite to the first switching direction. For example, if the first trigger control is a trigger control indicating functions such as "More" or "Expand", the second trigger control may be a trigger control indicating functions such as "Collapse".

For example, if the second group of function controls is preceded by the first group of function controls and followed by the third group of function controls, after the second group of function controls is displayed, the user can at least switch backward to the first group of function controls for display or switch forward to the third group of function controls for display. Therefore, the second trigger control can be displayed in the target interface sidebar while displaying the second group of function controls and the first trigger control.

In other embodiments, after S110, in a case where the second group of function controls is a last group of function controls in the first switching direction, the first trigger control is switched to the second trigger control in the target interface sidebar for display.

In the embodiment of the present disclosure, the second trigger control is used to trigger the switch from the second group of function controls to the first group of function controls in the target interface sidebar for display. Optionally, a switching direction (i.e., a second switching direction) corresponding to the second trigger control is opposite to the first switching direction. For example, if the first trigger control is a trigger control indicating functions such as "More" or "Expand", the second trigger control may be a trigger control indicating functions such as "Collapse".

Specifically, after switching to display the second group of function controls, if it is determined that the second group of function controls is the last group of function controls in the first switching direction, then there is no third group of function controls adjacent to the second group of function controls in the first switching direction among the function controls to be displayed, so that switching to display a third group of function controls is out of the question. In this case, the second trigger control can be displayed in the target interface sidebar, while the first trigger control is hidden. That is, if the second group of function controls is the last group of function controls in the first switching direction, the second trigger control corresponding to a switching direction opposite to the switching direction corresponding to the first trigger control can be displayed, and the first trigger control does not need to be displayed.

In still other embodiments, S110 comprises: displaying the first group of function controls, the first trigger control, and a second trigger control in the target interface sidebar in a case where the first group of function controls is not a primary group of function controls in the first switching direction. The primary group of function controls indicates a group of function controls that is in the first position in the first switching direction.

In the embodiment of the present disclosure, the second trigger control is used to trigger to switch from the first group of function controls to a fourth group of function controls in the target interface sidebar for display. The fourth group of function controls is adjacent to the first group of function controls in a second switching direction corresponding to the second trigger control. That is, the fourth group of function controls is a group of function controls adjacent to the first group of function controls in the second switching direction among the function controls to be displayed.

Specifically, if the first group of function controls is neither the primary group of function controls in the first switching direction nor the last group of function controls in the first switching direction, that is, there is a group of function controls (the fourth group of function controls) immediately before the first group of function controls and a group of function controls immediately after the first group of function controls in the first switching direction, then after displaying the first group of function controls in the target interface sidebar, the user can at least switch backward to the fourth group of function controls or switch forward to the third group of function controls. Therefore, the first group of function controls, the first trigger control, and the second trigger control can be displayed in the target interface sidebar simultaneously, so as to remind the user of function extension and to allow the user to switch between different function controls more conveniently and easily.

Figure 7:
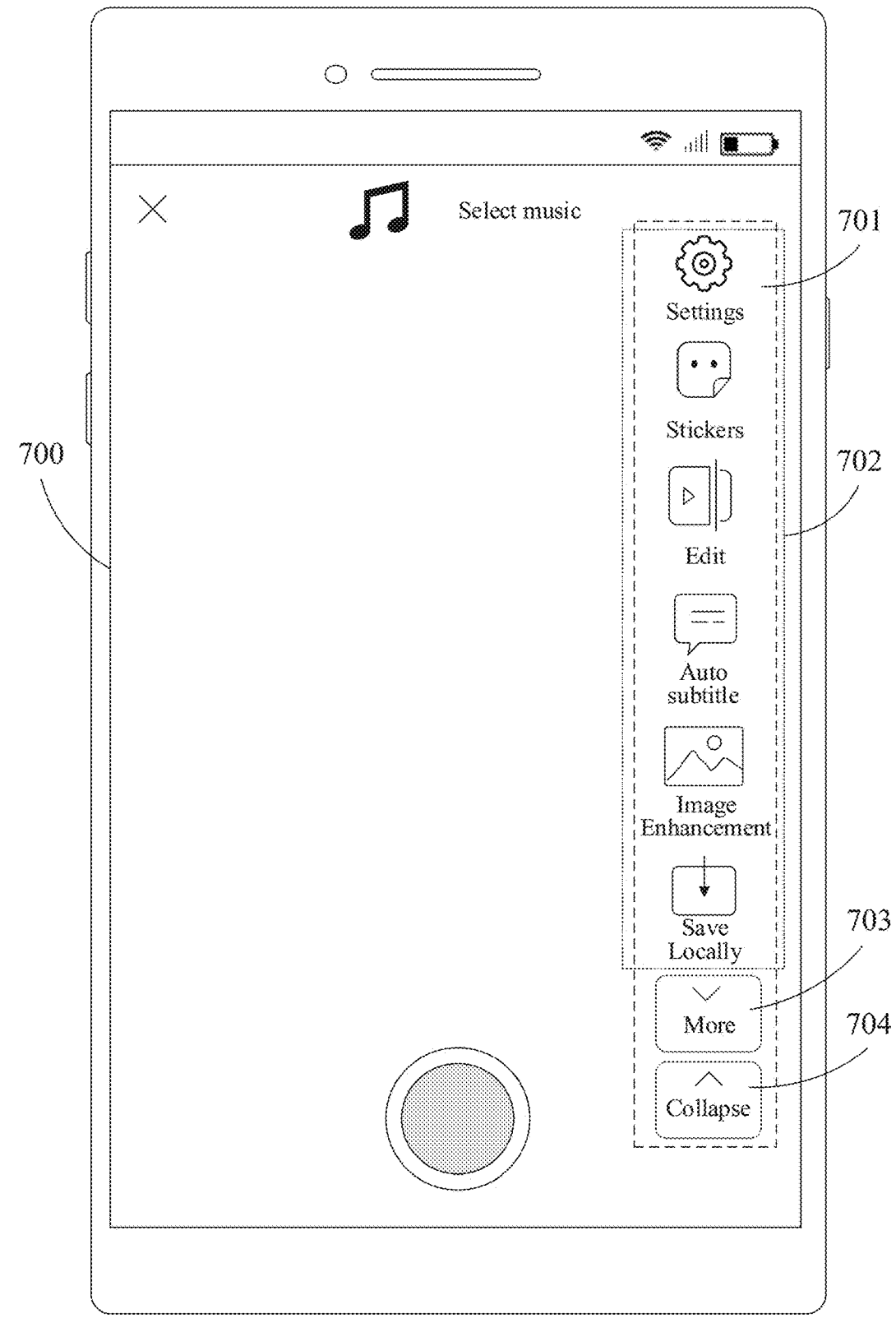
FIG. 7 is still another schematic diagram displaying a function control in an application interface according to an embodiment of the present disclosure.

FIG. 7 shows still another schematic diagram displaying a function control in an application interface according to an embodiment of the present disclosure. As shown in FIG. 7, the electronic device may display an application interface 700, a target interface sidebar 701 is displayed in the right sidebar of the application interface 700, and a first group of function controls 702, a first trigger control 703, and a second trigger control 704 are displayed in the target interface sidebar 701.

Further, on the basis of displaying the second trigger control in the target interface sidebar, when a second trigger operation on the second trigger control is detected, the first group of function controls is switched to a fourth group of function controls in the target interface sidebar and the fourth group of function controls is displayed.

The second trigger operation is a trigger operation on the second trigger control, and may be a click operation, a voice control operation, a gesture control operation, or an eye movement control operation.

Specifically, if the user triggers the second trigger control in the target interface sidebar, the electronic device can detect the second trigger operation on the second trigger control. In this case, the electronic device switches the first group of function controls in the target interface sidebar to the fourth group of function controls and display the fourth group of function controls. The process of switching display may be a static replacement process, and the user can see the results before and after switching, or the process of switching display may also be a dynamic switching process visible to the user.

Continuing referring to FIG. 4, if the second switching direction is a direction in which switching to a group of function controls located therebefore and adjacent thereto is performed, then after the user triggers the second trigger control 403, the first group of function controls 402 will be replaced by a fourth group of function controls located above the first group of function controls 402, and the display effect is shown in FIG. 2.

Continuing referring to FIG. 6, if the second switching direction is a direction in which switching to a group of function controls located therebefore and adjacent thereto is performed, then after the user triggers the second trigger control 603, the first group of function controls 602 will be replaced by a fourth group of function controls located to the left of the first group of function controls 602, and the display effect is shown in FIG. 3.

In still another implementation of the present disclosure, the switching process of different groups of function controls is a dynamic switching process.

In some embodiments, switching the first group of function controls to the second group of function controls in the target interface sidebar for display comprises: displaying a dynamic effect in the target interface sidebar, the dynamic effect comprising moving the first group of function controls out of the target interface sidebar along a first moving direction corresponding to the first switching direction at a preset speed and moving the second group of function controls into the target interface sidebar along the first moving direction corresponding to the first switching direction at the preset speed; and displaying the second group of function controls in the target interface sidebar when a display of the dynamic effect is completed.

Specifically, when dynamically switching between the function controls to be displayed, a moving speed (i.e. the preset speed) is predetermined. After the user triggers the first trigger control or the second trigger control, the different groups of function controls will move synchronously along the first moving direction corresponding to the first switching direction at the preset speed. Alternatively, after the user triggers the second trigger control, the different groups of function controls will move synchronously along a second moving direction corresponding to the second switching direction at the preset speed. The first moving direction here may be parallel or perpendicular to the first switching direction. Similarly, the second moving direction may be parallel or perpendicular to the second switching direction.

Figure 8:
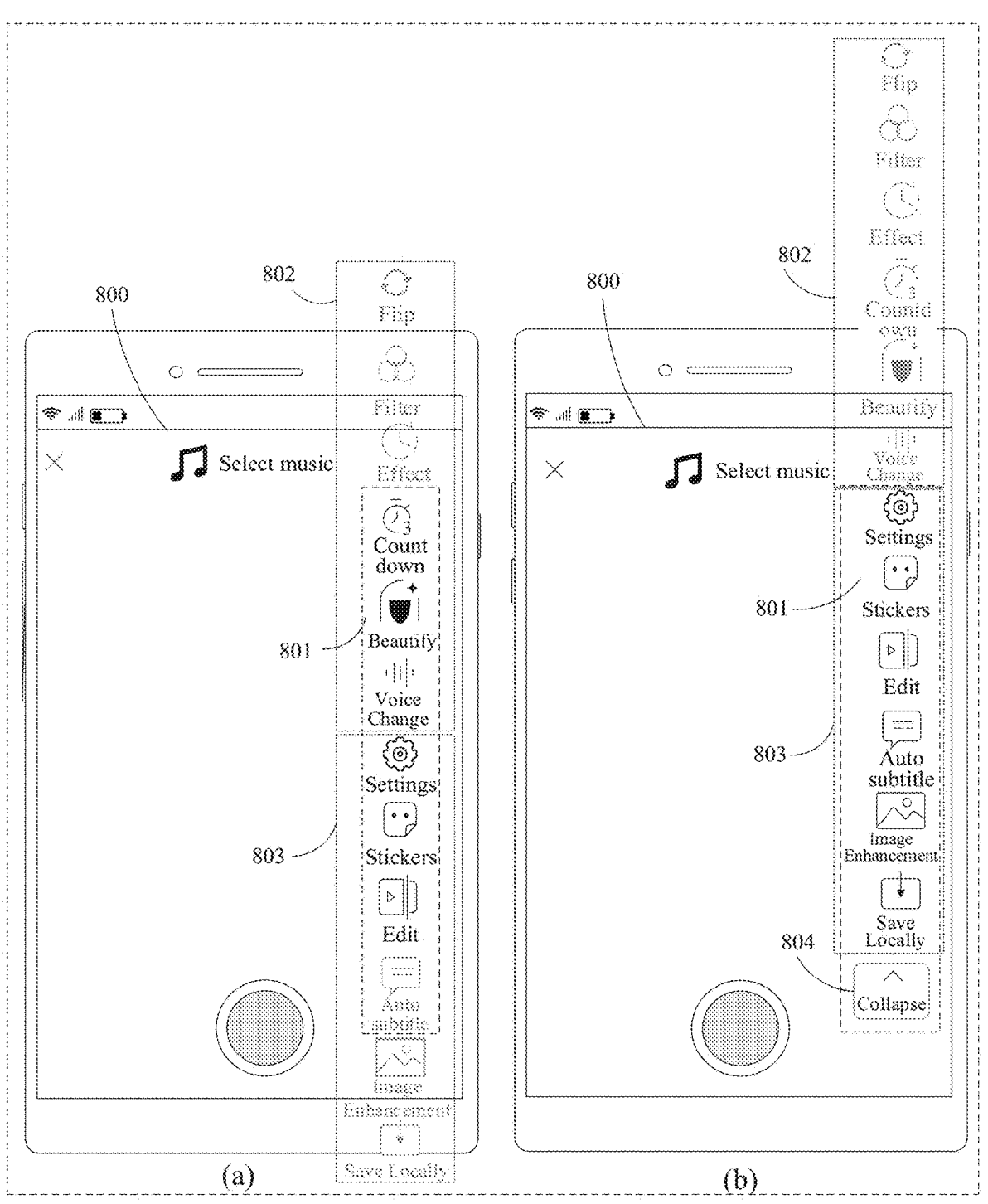
FIG. 8 is still another schematic diagram displaying a function control in an application interface according to an embodiment of the present disclosure.

FIG. 8 shows still another schematic diagram displaying a function control in an application interface according to an embodiment of the present disclosure. The content shown in FIG. 8 illustrates the dynamic switching process by taking a case where the first group of function controls in FIG. 2 is switched to the second group of function controls located below the first group of function controls as an example.

As shown in FIG. 8(*a*), after the user triggers the first trigger control 203 in FIG. 2, the first trigger control in the target interface sidebar 801 in the application interface 800 is hidden, and a first group of function controls 802 and a second group of function controls 803 are moved upward at a preset speed. In this process, after the function controls to be displayed move into the range of the target interface sidebar 801, the function controls to be displayed are displayed. The function controls to be displayed are hidden (shown in gray in FIG. 8) after the function controls to be displayed move out of the range of the target interface sidebar 801 or when the function controls to be displayed do not enter the range of the target interface sidebar 801. When the first group of function controls 802 completely moves out of the range of the target interface sidebar 801 and the second group of function controls 803 completely moves into the range of the target interface sidebar 801, the movement stops, as shown in FIG. 8(*b*). In this state, the second group of function controls 803 will become the first group of function controls after switching, and the first group of function controls 802 will become the fourth group of function controls after switching. In this case, it is necessary to display the second trigger control 804 again in the target interface sidebar 801.

In yet another implementation of the present disclosure, the display size of the target interface sidebar may remain unchanged or dynamically change.

In some embodiments, both the length of the short side and the length of the long side of the target interface sidebar remain unchanged, and the length of the long side is set to the maximum length that can be displayed. Referring to FIG. 5, the size of the target interface sidebar 501 remains unchanged at the maximum display size during the process of left-right switching the two groups of function controls for display.

In other embodiments, the first moving direction is parallel to the length direction of the target interface sidebar, and in the process of displaying the dynamic effect, the display size of the target interface sidebar is adjusted according to the number of controls in the first group of function controls, the number of controls in the second group of function controls, and the preset speed.

Specifically, in the process of dynamic switch, the length of the short side of the target interface sidebar remains unchanged, while the length of the long side is automatically adjusted according to the number of displayed controls and the preset speed of moving. In the automatic adjustment process, the duration required for the first group of function controls to completely move out can be calculated according to the preset speed. Additionally, the difference between the number of controls in the first group of function controls and the number of controls in the second group of function controls can be calculated. This difference can be multiplied by the length of a display region to which a control is preset to belong to get the total length that needs to be adjusted. Then by dividing the total length that needs to be adjusted by the duration, the speed at which the length of the target interface sidebar increases synchronously during the move-out process of the first group of function controls can be obtained.

As shown in FIG. 3, before the switch, the first group of function controls 302 comprises four function controls to be displayed, and after the switch, the first group of function controls 602 in FIG. 6 comprises five function controls to be displayed, so that the length of the target interface sidebar 601 after switching is greater than the length of the target interface sidebar 301 before switching. In this way, the length of the target interface sidebar is automatically adjusted to avoid the problems that an undersized sidebar cannot accommodate the function controls to be displayed and an oversized sidebar may cause other functions to fail or be accidentally triggered.

In another implementation of the present disclosure, besides the function controls to be displayed, other function controls can also be displayed in the target interface sidebar.

In some embodiments, a target function control is fixedly displayed in the target interface sidebar, and the target function control is a function control other than the first group of function controls and the second group of function controls. In this embodiment, at least one target function control other than the function controls to be displayed is fixedly displayed in the target interface sidebar. The position of the target function control does not change with the switch between different groups of function controls.

Taking the target interface sidebar as the right sidebar as an example, the target function control can be displayed at the top of the target interface sidebar, and the respective groups of function controls which can be switched can be displayed below the target function control. The target function control can be a function control to be displayed that the user uses most frequently, so that the user can use the target function control more conveniently.

In yet another implementation of the present disclosure, overlapping function controls may exist between different groups of function controls.

In some embodiments, the first group of function controls and the second group of function controls partially overlap. That is to say, in the switching process of different groups of function controls, some overlapping function controls to be displayed are not switched and are always displayed in the target interface sidebar.

For example, the overlapping function control can be arranged at the end of the first group of function controls, and the last function control to be displayed in the first group of function controls is controlled not to be switched during the switching process, that is, only some function controls to be displayed in the whole first group of function controls are switched. In an example, the target interface sidebar is the right sidebar, the first switching direction is a direction in which switching to a group of function controls located thereafter and adjacent thereto is performed, the function control to be displayed moves upward, and the overlapping function control that should not be switched is arranged at the end of the first group of function controls. When the first group of function controls moves upward to the last function control to be displayed, the movement is stopped and the last function control to be displayed continues to be displayed in the target interface sidebar.

For another example, the overlapping function controls can be arranged at the end of the first group of function controls and at the beginning of the second group of function controls, the entire group of function controls is switched to display during the switching process.

In an example, the target interface sidebar is the right sidebar, the first switching direction is a direction in which switching to a group of function controls located thereafter and adjacent thereto is performed, the function control to be displayed moves upward, and the overlapping function controls that should not be switched are arranged at the end of the first group of function controls and at the beginning of the second group of function controls. In this way, after switching, only the display positions of the overlapping function controls that should not be switched change, but the overlapping function controls that should not be switched are still displayed within the target interface sidebar.

For another example, the overlapping function controls can be arranged at the beginning or the end of the first group of function controls and the second group of function controls, the entire group of function controls is switched to display during the switching process.

In an example, the target interface sidebar is the right sidebar, the first switching direction is a direction in which switching to a group of function controls located thereafter and adjacent thereto is performed, the function control to be displayed moves to the left, and after the first group of function controls moves leftward out of the target interface sidebar and the second group of function controls moves leftward into the target interface sidebar, the overlapping function controls are still displayed at the top of the target interface sidebar.

The above-mentioned overlapping function control is a function control to be displayed which is frequently used by the user. Through the above settings, the overlapping function control can be kept displayed in the target interface sidebar, so that the user can use the overlapping function control more conveniently and easily.

An embodiment of the present disclosure also provides a control display apparatus, which will be described below with reference to FIG. 9.

In the embodiment of the present disclosure, the control display apparatus may be an electronic device. The electronic device may include, but is not limited to, mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable device, or the like, and fixed terminals such as a digital TV, a desktop computer, a smart home device, or the like.

Figure 9:
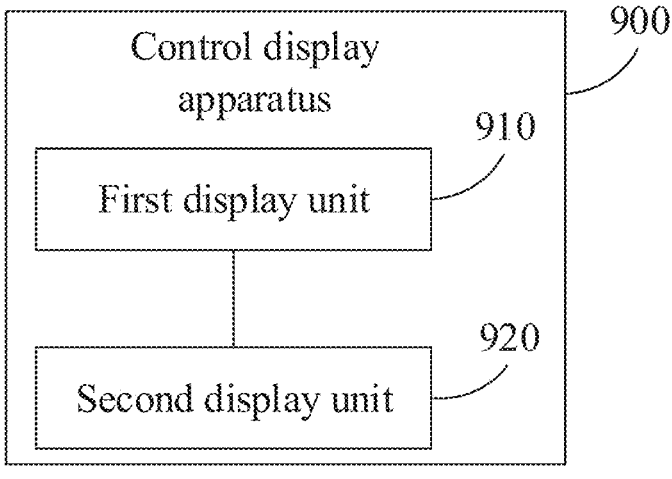
FIG. 9 is a structural schematic diagram of a control display apparatus provided by an embodiment of the present disclosure.

FIG. 9 shows a structural schematic diagram of a control display apparatus provided by an embodiment of the present disclosure.

As shown in FIG. 9, the control display apparatus 900 may comprise a first display unit 910 and a second display unit 920.

The first display unit 910 is configured to display a first group of function controls and a first trigger control in a target interface sidebar.

The second display unit 920 is configured to switch the first group of function controls to a second group of function controls in the target interface sidebar for display upon detecting a first trigger operation on the first trigger control.

Here, the second group of function controls is adjacent to the first group of function controls in a first switching direction corresponding to the first trigger control.

According to the control display apparatus provided by the embodiment of the present disclosure, function controls can be displayed in groups within a target interface sidebar, thus increasing the number of function controls that can be provided for users in the sidebar of the interactive interface, and enhancing the function expansion capability of the sidebar of the interactive interface. By triggering a first trigger control, a first group of function controls can be switched to a second group of function controls, which is adjacent to the first group of function controls in a first switching direction corresponding to the first trigger control, in the target interface sidebar for display, so as to provide the user with more interactive functions that can be used under the circumstance of facilitating the operation of the user, thereby enhancing the user experience.

In some embodiments, the first display unit 910 is specifically configured to:

display the first group of function controls and the first trigger control in the target interface sidebar in a case where a total number of function controls to be displayed is greater than a preset quantity threshold.

Optionally, the control display apparatus 900 further comprises a third display unit that is configured to:

display the function controls to be displayed in the target interface sidebar when the total number of the function controls to be displayed is less than or equal to the preset quantity threshold.

In some embodiments, the first switching direction indicates switching to a group of function controls located thereafter and adjacent thereto, and the second group of function controls is a group of function controls located after the first group of function controls and adjacent to the first group of function controls.

Alternatively, the first switching direction indicates switching to a group of function controls located therebefore and adjacent thereto, and the second group of function controls is a group of function controls located before the first group of function controls and adjacent to the first group of function controls.

In some embodiments, the control display apparatus 900 further comprises a fourth display unit that is configured to:

after detecting the first trigger operation on the first trigger control, in a case where the second group of function controls is not a last group of function controls in the first switching direction, keep to display the first trigger control in the target interface sidebar. The first trigger control is used to trigger to switch from the second group of function controls to a third group of function controls in the target interface sidebar for display, and the third group of function controls is adjacent to the second group of function controls in the first switching direction.

Optionally, the control display apparatus 900 further comprises a fifth display unit that is configured to:

after detecting the first trigger operation on the first trigger control, in a case where the second group of function controls is a last group of function controls in the first switching direction, switch the first trigger control to a second trigger control in the target interface sidebar for display, the second trigger control being used to trigger to switch from the second group of function controls to the first group of function controls in the target interface sidebar for display.

In some embodiments, the first display unit 910 is specifically configured to:

display the first group of function controls, the first trigger control, and a second trigger control in the target interface sidebar in a case where the first group of function controls is not a primary group of function controls in the first switching direction.

The second trigger control is used to trigger to switch from the first group of function controls to a fourth group of function controls in the target interface sidebar for display, the fourth group of function controls is adjacent to the first group of function controls in a second switching direction corresponding to the second trigger control, and the second switching direction is opposite to the first switching direction.

Further, the control display apparatus 900 further comprises a sixth display unit that is configured to:

switch the first group of function controls to the fourth group of function controls in the target interface sidebar for display when a second trigger operation on the second trigger control is detected.

In some embodiments, the second display unit 920 is specifically configured to:

display a dynamic effect in the target interface sidebar, the dynamic effect comprising moving the first group of function controls out of the target interface sidebar along a first moving direction corresponding to the first switching direction at a preset speed and moving the second group of function controls into the target interface sidebar along the first moving direction corresponding to the first switching direction at the preset speed; and display the second group of function controls in the target interface sidebar when a display of the dynamic effect is completed.

Further, the control display apparatus 900 also comprises a display size adjustment unit configured to:

in the case that the first moving direction is parallel to a length direction of the target interface sidebar, and during a process of displaying the dynamic effect, adjust a display size of the target interface sidebar according to the amount of controls of the first group of function controls, the amount of controls of the second group of function controls, and the preset speed.

In some embodiments, the control display apparatus 900 further comprises a seventh display unit configured to: fixedly display a target function control in the target interface sidebar. The target function control is a function control other than the first group of function controls and the second group of function controls.

In some embodiments, the first group of function controls and the second group of function controls partially overlap.

It should be noted that the control display apparatus 900 shown in FIG. 9 can perform various steps in the method embodiments shown in FIGS. 1-8, and implement various processes and effects in the method embodiments shown in FIGS. 1-8, which will not be repeated here.

An embodiment of the present disclosure further provides a control display device, and the control display device may comprise a processor and a memory, and the memory can be used to store executable instructions. The processor can be used to read the executable instructions from the memory and execute the executable instructions to implement the control display method in the above embodiments.

Figure 10:
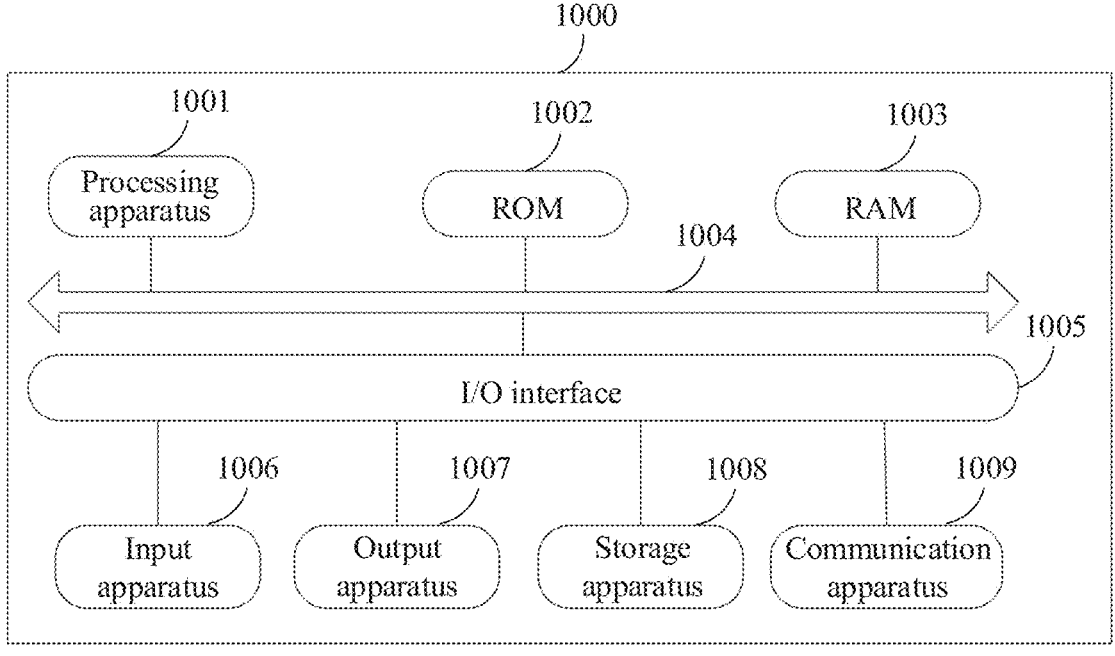
FIG. 10 is a structural schematic diagram of a control display device provided by an embodiment of the present disclosure.

FIG. 10 shows a structural diagram of a control display device provided by an embodiment of the present disclosure. Referring specifically to FIG. 10, a structural schematic diagram suitable for implementing the control display device 1000 in the embodiments of the present disclosure is shown.

The control display device 1000 in the embodiment of the present disclosure may be a control display device. The control display device may include, but is not limited to, mobile terminals such as a mobile phone, a notebook computer, a digital broadcasting receiver, a personal digital assistant (PDA), a tablet computer (PAD), a portable multimedia player (PMP), a vehicle-mounted terminal (such as a vehicle-mounted navigation terminal), a wearable device, or the like, and fixed terminals such as a digital TV, a desktop computer, a smart home device, or the like.

It should be noted that the control display device 1000 shown in FIG. 10 is only an example, and should not impose any limitation to the functions and the range of use of the embodiment of the present disclosure.

As shown in FIG. 10, the control display device 1000 may comprises a processing apparatus 1001 (e.g., a central processing unit, a graphics processing unit, etc.), which can perform various suitable actions and processing according to a program stored in a read-only memory (ROM) 1002 or a program loaded from a storage apparatus 1008 into a random-access memory (RAM) 1003. The RAM 1003 further stores various programs and data required for operations of the control display device 1000. The processing apparatus 1001, the ROM 1002, and the RAM 1003 are interconnected by means of a bus 1004. An input/output (I/O) interface 1005 is also connected to the bus 1004.

Usually, the following apparatus may be connected to the I/O interface 1005: an input apparatus 1006 including, for example, a touch screen, a touch pad, a keyboard, a mouse, a camera, a microphone, an accelerometer, a gyroscope, or the like; an output apparatus 1007 including, for example, a liquid crystal display (LCD), a loudspeaker, a vibrator, or the like; a storage apparatus 1008 including, for example, a magnetic tape, a hard disk, or the like; and a communication apparatus 1009. The communication apparatus 1009 may allow the control display device 1000 to be in wireless or wired communication with other devices to exchange data. While FIG. 10 illustrates the control display device 1000 having various apparatuses, it should be understood that not all of the illustrated apparatuses are necessarily implemented or included. More or fewer apparatuses may be implemented or included alternatively.

An embodiment of the present disclosure further provides a computer-readable storage medium, the computer-readable storage medium stores a computer program, and when the computer program is executed by a processor, the processor is caused to implement the control display method in the above embodiments.

Particularly, according to the embodiments of the present disclosure, the processes described above with reference to the flowcharts may be implemented as a computer software program. For example, the embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 1009 and installed, or may be installed from the storage apparatus 1008, or may be installed from the ROM 1002. When the computer program is executed by the processing apparatus 1001, the above-mentioned functions defined in the control display method of the embodiments of the present disclosure are performed.

It should be noted that the computer readable medium described above in the present disclosure may be a computer readable signal medium or a computer readable storage medium or any combination thereof. For example, the computer readable storage medium may be, but not limited to, an electric, magnetic, optical, electromagnetic, infrared, or semiconductor system, apparatus, or device, or any combination of them. More specific examples of the computer readable storage medium may include, but are not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them. In the present disclosure, the computer readable storage medium may be any tangible medium containing or storing a program that can be used by or in combination with an instruction execution system, apparatus, or device. In the present disclosure, the computer readable signal medium may include a data signal that propagates in a baseband or as a part of a carrier and carries computer readable program codes. The data signal propagating in such a manner may take a variety of forms, including but not limited to an electromagnetic signal, an optical signal, or any appropriate combination thereof. The computer readable signal medium may also be any computer readable medium other than the computer readable storage medium. The computer readable signal medium may send, propagate, or transmit a program used by or in combination with an instruction execution system, apparatus, or device. The program code contained on the computer readable medium may be transmitted by using any suitable medium, including but not limited to an electric wire, a fiber-optic cable, radio frequency (RF), and the like, or any appropriate combination of them.

In some implementations, a client and a server may communicate by using any currently known or future developed network protocol, such as HTTP (HyperText Transfer Protocol), and may be interconnected with digital data communication (for example, the communications network) in any form or medium. Examples of the communication network include a local area network ("LAN"), a wide area network ("WAN"), the Internet (for example, the Internet), and an end-to-end network (for example, an ad hoc end-to-end network), as well as any currently known or future developed network.

The above-mentioned computer-readable medium may be included in the above-mentioned control display device, or may also exist alone without being assembled into the control display device.

The above-mentioned computer-readable medium carries one or more programs, and when the one or more programs are executed by the control display device, the control display device is caused to: display a first group of function controls and a first trigger control in a target interface sidebar, and switch the first group of function controls to a second group of function controls in the target interface sidebar for display upon detecting a first trigger operation on the first trigger control.

The second group of function controls is adjacent to the first group of function controls in a first switching direction corresponding to the first trigger control.

In the embodiments of the present disclosure, the computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or may be connected to an external computer (e.g., connected through the Internet from an Internet Service Provider).

The flowcharts and block diagrams in the accompanying drawings illustrate system architectures, functions, and operations that may be implemented according to the method, device, and computer program products provided by the various embodiments of the present disclosure. In this regard, each block in the flowcharts or block diagrams may represent a module, a program segment, or a part of code, and the module, the program segment, or the part of code includes one or more executable instructions for implementing specified logic functions. It should also be noted that, in some alternative implementations, functions marked in the blocks may also occur in an order different from the order designated in the accompanying drawings. For example, two consecutive blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a dedicated hardware-based system for executing specified functions or operations, or may be implemented by a combination of a dedicated hardware and computer instructions.

The units described in the embodiments of the present disclosure may be implemented by software, or may be implemented by hardware. The name of the unit does not constitute a limitation on the unit itself in certain circumstances.

The functions described above in the present disclosure may be executed at least in part by one or more hardware logic components. For example, without limitations, exemplary types of the hardware logic components that can be used include: a field programmable gate array (FPGA), an application specific integrated circuit (ASIC), an application specific standard product (ASSP), a system on chip (SOC), a complex programmable logic device (CPLD), and the like.

In the context of the present disclosure, a machine readable medium may be a tangible medium that may contain or store a program for use by or in combination with an instruction execution system, apparatus, or device. The machine readable medium may be a machine readable signal medium or a machine readable storage medium. The machine readable medium may include but not be limited to an electronic, magnetic, optical, electromagnetic, infrared, or semiconductor system, apparatus, or device, or any appropriate combination of them. More specific examples of the machine readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them.

The foregoing descriptions are merely the illustrations of the preferred embodiments of the present disclosure and the explanations of the technical principles involved. Those skilled in the art should understand that the scope of the disclosure involved in the present disclosure is not limited to the technical solutions formed by a specific combination of the technical features described above, and shall also cover other technical solutions formed by any combination of the technical features described above or equivalent features thereof without departing from the concept of the present disclosure. For example, the technical features described above may be mutually replaced with the technical features having similar functions disclosed in the present disclosure (but not limited thereto) to form new technical solutions.

In addition, while operations have been described in a particular order, it shall not be construed as requiring that such operations are performed in the stated particular order or in a sequential order. Under certain circumstances, multitasking and parallel processing may be advantageous.

Similarly, while some specific implementation details are included in the above discussions, these shall not be construed as limitations to the scope of the present disclosure. Some features described in the context of a separate embodiment may also be combined and implemented in a single embodiment. Conversely, various features described in the context of a single embodiment may also be implemented in a plurality of embodiments individually or in any appropriate sub-combination.

Although the present subject matter has been described in a language specific to structural features and/or method logical acts, it should be understood that the subject matter defined in the appended claims is not necessarily limited to the particular features or acts described above. Rather, the particular features and acts described above are merely exemplary forms for implementing the claims.

The invention claimed is:

1. A control display method, comprising:
displaying a first group of function controls and a first trigger control in an interface sidebar; and
switching the first group of function controls to a second group of function controls in the interface sidebar for display upon detecting a first trigger operation on the first trigger control, wherein after the switching, the second group of function controls replaces the first group of function controls and is displayed in the target interface sidebar,
wherein the second group of function controls is adjacent to the first group of function controls in an arrangement order in a first switching direction corresponding to the first trigger control,
wherein the switching the first group of function controls to a second group of function controls in the interface sidebar for display upon detecting a first trigger operation on the first trigger control comprises:
displaying a dynamic effect in the interface sidebar, the dynamic effect comprising moving the first group of function controls out of the interface sidebar along a first moving direction corresponding to the first switching direction at a preset speed and moving the second group of function controls into the interface sidebar along the first moving direction corresponding to the first switching direction at the preset speed; and
displaying the second group of function controls in the interface sidebar when the dynamic effect is completed, and
wherein the first moving direction is parallel to a length direction of the interface sidebar, and during a process of displaying the dynamic effect, the first trigger control in the interface sidebar is hidden, a length of a short side of the interface sidebar remains unchanged, and a length of a long side of the interface sidebar is automatically adjusted according to a number of controls of the first group of function controls and a number of controls of the second group of function controls, with a change in the length of the long side being synchronized to the preset speed.

2. The method according to claim 1, wherein the displaying a first group of function controls and a first trigger control in an interface sidebar comprises:
displaying the first group of function controls and the first trigger control in the interface sidebar in response to a total number of the function controls to be displayed being greater than a preset quantity threshold.

3. The method according to claim 1, wherein the first switching direction is a direction in which switching to a group of function controls located thereafter and adjacent thereto is performed, and the second group of function controls is a group of function controls located after the first group of function controls and adjacent to the first group of function controls.

4. The method according to claim 1, wherein the first switching direction is a direction in which switching to a group of function controls located therebefore and adjacent thereto is performed, and the second group of function controls is a group of function controls located before the first group of function controls and adjacent to the first group of function controls.

5. The method according to claim 1, wherein after the detecting a first trigger operation on the first trigger control, the method further comprises:

in response to the second group of function controls being not a last group of function controls in the first switching direction, keeping to display the first trigger control in the interface sidebar, wherein the first trigger control is used to trigger to switch from the second group of function controls to a third group of function controls in the interface sidebar for display, and the third group of function controls is adjacent to the second group of function controls in the first switching direction.

6. The method according to claim 1, wherein the first group of function controls and the second group of function controls partially overlap.

7. A computer-readable storage medium, wherein the computer-readable storage medium stores a computer program, when the computer program is executed by a processor, the processor implements the control display method according to claim 1.

8. The method according to claim 1, further comprising:

fixedly displaying a first function control in the interface sidebar, wherein the first function control is a function control other than the first group of function controls and the second group of function controls, and is a function control to be displayed that a user uses most frequently.

9. The method according to claim 1, wherein the displaying the first group of function controls and the first trigger control in the interface sidebar comprises displaying the first group of function controls, the first trigger control, and a second trigger control in the interface sidebar in response to the first group of function controls being not a primary group of function controls in the first switching direction, and wherein the second trigger control is used to trigger to switch from the first group of function controls to a fourth group of function controls in the interface sidebar for display, wherein after the switching, the fourth group of function controls replaces the first group of function controls and is displayed in the interface sidebar, the fourth group of function controls is adjacent to the first group of function controls in the arrangement order in a second switching direction corresponding to the second trigger control, and the second switching direction is opposite to the first switching direction.

10. The method according to claim 9, wherein after the detecting a first trigger operation on the first trigger control, the method further comprises:

in response to the second group of function controls being a last group of function controls in the first switching direction, not displaying the first trigger control in the interface sidebar, and displaying the second trigger control in the interface sidebar, wherein the second trigger control is used to trigger to switch from the second group of function controls to the first group of function controls in the interface sidebar for display.

11. The method according to claim 1, wherein the first group of function controls and the second group of function controls are obtained by grouping function controls to be displayed based on a frequency of use of the function controls to be displayed by a user.

12. A control display apparatus, comprising:

a first display unit, configured to display a first group of function controls and a first trigger control in an interface sidebar; and a second display unit, configured to switch the first group of function controls to a second group of function controls in the interface sidebar for display upon detecting a first trigger operation on the first trigger control, wherein after the switching, the second group of function controls replaces the first group of function controls and is displayed in the interface sidebar, wherein the second group of function controls is adjacent to the first group of function controls in an arrangement order in a first switching direction corresponding to the first trigger control, wherein when performing a step of switching the first group of function controls to a second group of function controls in the interface sidebar for display upon detecting a first trigger operation on the first trigger control, the second display unit is configured to:

display a dynamic effect in the interface sidebar, the dynamic effect comprising moving the first group of function controls out of the interface sidebar along a first moving direction corresponding to the first switching direction at a preset speed and moving the second group of function controls into the interface sidebar along the first moving direction corresponding to the first switching direction at the preset speed; and display the second group of function controls in the interface sidebar when the dynamic effect is completed, and wherein the first moving direction is parallel to a length direction of the interface sidebar, and during a process of displaying the dynamic effect, the first trigger control in the interface sidebar is hidden, a length of a short side of the interface sidebar remains unchanged, and a length of a long side of the interface sidebar is automatically adjusted according to a number of controls of the first group of function controls and a number of controls of the second group of function controls, with a change in the length of the long side being synchronized to the preset speed.

13. The control display apparatus according to claim 12, wherein the first display unit is configured to display the first group of function controls and the first trigger control in the interface sidebar in response to a total number of the function controls to be displayed being greater than a preset quantity threshold;

wherein the control display apparatus further comprises a third display unit, and the third display unit is configured to: display the function controls to be displayed in the interface sidebar when the total number of the function controls to be displayed is less than or equal to the preset quantity threshold.

14. The control display apparatus according to claim 12, further comprising a fourth display unit, wherein after detecting the first trigger operation on the first trigger control, the fourth display unit is configured to: in response to the second group of function controls being not a last group of function controls in the first switching direction, keep to display the first trigger control in the interface sidebar, wherein the first trigger control is used to trigger to switch from the second group of function controls to a third group of function controls in the interface sidebar for display, and the third group of function controls is adjacent to the second group of function controls in the first switching direction.

15. The control display apparatus according to claim 12, further comprising a sixth display unit, wherein the first display unit is configured to display the first group of function controls, the first trigger control, and a second trigger control in the interface sidebar in response to the first group of function controls being not a primary group of function controls in the first switching direction, wherein the second trigger control is used to trigger to switch from the first group of function controls to a fourth group of function controls in the interface sidebar for display, wherein after the switching, the fourth group of function controls replaces the first group of function controls and is displayed in the interface sidebar, the fourth group of function controls is adjacent to the first group of function controls in the arrangement order in a second switching direction corresponding to the second trigger control, and the second switching direction is opposite to the first switching direction, and wherein the sixth display unit is configured to: switch the first group of function controls to the fourth group of function controls in the interface sidebar for display when a second trigger operation on the second trigger control is detected.

16. A control display device, comprising:

a processor; and a memory, for storing executable instructions;

wherein the processor is used to read the executable instructions from the memory and execute the executable instructions to implement a control display method, wherein the control display method comprises:

displaying a first group of function controls and a first trigger control in an interface sidebar; and switching the first group of function controls to a second group of function controls in the interface sidebar for display upon detecting a first trigger operation on the first trigger control, wherein after the switching, the second group of function controls replaces the first group of function controls and is displayed in the interface sidebar, wherein the second group of function controls is adjacent to the first group of function controls in an arrangement order in a first switching direction corresponding to the first trigger control, wherein the switching the first group of function controls to a second group of function controls in the interface sidebar for display upon detecting a first trigger operation on the first trigger control comprises:

displaying a dynamic effect in the interface sidebar, the dynamic effect comprising moving the first group of function controls out of the interface sidebar along a first moving direction corresponding to the first switching direction at a preset speed and moving the second group of function controls into the interface sidebar along the first moving direction corresponding to the first switching direction at the preset speed; and displaying the second group of function controls in the interface sidebar when the dynamic effect is completed, and wherein the first moving direction is parallel to a length direction of the interface sidebar, and during a process of displaying the dynamic effect, the first trigger control in the interface sidebar is hidden, a length of a short side of the interface sidebar remains unchanged, and a length of a long side of the interface sidebar is automatically adjusted according to a number of controls of the first group of function controls and a number of controls of the second group of function controls, with a change in the length of the long side being synchronized to the preset speed.

* * * * *